United States Patent
Silventoinen et al.

(10) Patent No.: US 6,597,914 B1
(45) Date of Patent: Jul. 22, 2003

(54) METHOD FOR DETERMINING TIMING DIFFERENCES BETWEEN RADIO TRANSMITTERS AND A RADIO NETWORK INCORPORATING THE SAME

(75) Inventors: Marko Silventoinen, Helsinki (FI); Timo Rantalainen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/423,373
(22) PCT Filed: May 9, 1997
(86) PCT No.: PCT/EP97/02400
§ 371 (c)(1), (2), (4) Date: Feb. 4, 2000
(87) PCT Pub. No.: WO98/52376
PCT Pub. Date: Nov. 19, 1998

(51) Int. Cl.⁷ .................................................. H04Q 7/20
(52) U.S. Cl. .................... 455/456; 455/503; 455/67.1; 455/446; 455/423; 370/350; 342/450; 342/457
(58) Field of Search .................... 455/503, 67.6, 455/456, 457, 502, 524, 446, 423, 67.1; 342/450, 457; 370/350

(56) References Cited

U.S. PATENT DOCUMENTS

| 5,128,925 A | * 7/1992 | Dornstetter et al. |
| 5,423,067 A | 6/1995 | Manabe |
| 5,512,908 A | 4/1996 | Herrick |
| 5,600,706 A | 2/1997 | Dunn et al. |
| 6,201,803 B1 | * 3/2001 | Munday et al. |

FOREIGN PATENT DOCUMENTS

| EP | 0398773 | 11/1990 |
| EP | 0767594 | 4/1997 |
| WO | 92/05672 | 4/1992 |
| WO | 95/00821 | 1/1995 |
| WO | 96/35306 | 11/1996 |
| WO | 97/23785 | 7/1997 |

* cited by examiner

Primary Examiner—Dwayne Bost
Assistant Examiner—Huy Nguyen
(74) Attorney, Agent, or Firm—Squire, Sanders & Dempsey LLP

(57) ABSTRACT

There are proposed a method for determining timing differences between a plurality of radio transmitters (BTS) and a radio network incorporating the method. Timing information of signals received by measuring means from said plurality of radio transmitters (BTS) is determined. The timing differences between said plurality of radio transmitters (BTS) are determined on the basis of said timing information determined by said measuring means and the respective distance differences between said plurality of radio transmitters (BTS) and said measuring means. This method can be advantageously applied to locating mobile stations in a mobile radio network.

19 Claims, 3 Drawing Sheets

METHOD FOR DETERMINING TIMING DIFFERENCES BETWEEN RADIO TRANSMITTERS AND A RADIO NETWORK INCORPORATING THE SAME

FIELD OF THE INVENTION

The present invention relates to a method for determining timing differences between radio transmitters and a radio network incorporating the same. More specifically, the present invention relates to the determination of timing differences between base transceiver stations in a mobile radio network. This method of determining the real time differences is based on the measurement of the observed time differences.

BACKGROUND OF THE INVENTION

In mobile radio networks such as the GSM system used throughout Europe, it is necessary that the position of each mobile station is known to the base stations with a sufficient accuracy.

There are already some methods for determining the locations of mobile stations in a mobile radio network. For many of the location methods such as those based on Time Difference on Arrival (TDOA) or Direction Finding (DF), it is necessary that the base transceiver stations operate synchronously with respect to each other. However, in the GSM mobile radio network as it is currently used in Europe, the base transceiver stations operate asynchronously with respect to each other, or the synchronisation is not accurate enough for location purposes. For this reason, it would be desirable to know the timing differences of the signals transmitted by the base transceiver stations.

However, no method is available at present which would be able to determine these timing differences. As a result, it is not possible to locate a particular mobile station with a high accuracy.

SUMMARY OF THE INVENTION

It is, therefore, an object of the present invention to provide a method for determining timing differences between a plurality of radio transmitters in a radio network. It is another object of the present invention to provide a method for determining timing differences between a plurality of base transceiver stations in a mobile radio network which would allow to increase the accuracy of locating the mobile stations. It is a further object of the present invention to provide a radio network in which such methods can be carried out.

According to the present invention, this object is accomplished by a method for determining timing differences between a plurality of radio transmitters in a radio network, comprising the steps of determining timing information of signals received by measuring means from said plurality of radio transmitters, and determining the timing differences between said plurality of radio transmitters on the basis of said timing information determined by said measuring means and the respective distance differences between said plurality of radio transmitters and said measuring means.

According to the present invention, this object is also achieved by a radio network as defined in claim 9.

In this way, the timing differences between the plurality of radio transmitters can be determined. Thus, if the radio transmitters are base transceiver stations in a mobile radio network, it becomes possible to determine the location of any mobile station moving at some point in the mobile radio network with a much higher accuracy than has been possible in the prior art. This requires in addition that those mobile stations whose positions are to be calculated determine timing information of signals received from the plurality of base transceiver stations. Furthermore, since the knowledge of the timing differences allows to operate the base transceiver stations in a pseudo-synchronous manner, the way of effecting handovers of the mobile stations can be improved.

Advantageous embodiments of the present invention are defined in the subclaims.

The preferred embodiments of the present invention will be described in detail hereinbelow by way of example with reference to the accompanying drawings.

DESCRIPTION OF THE PREFERRED EMBODIMENTS

The method according to the present invention aims at determining the timing difference of signals transmitted by radio transmitters in a radio network. More specifically, the timing difference of signals transmitted by base transceiver stations in a mobile radio network can be determined. This timing difference corresponding to the synchronisation difference between the base transceiver stations is referred to as the real time difference. In theory, when the network is synchronised, two base transceiver stations should send TDMA bursts at exactly the same time, i.e. the synchronisation error between two base transceiver stations in the network should be zero. In practice, however, the mobile radio network, like GSM, is normally not synchronised, and the real time difference corresponds to the difference of the transmission times of two bursts from two base transceiver stations.

The method according to the invention is based on the calculation of the difference between the so-called observed time difference OTD and the so-called geometric time difference GTD. Namely, the observed time difference is the sum of the real time difference and the geometric time difference.

Figure 1:
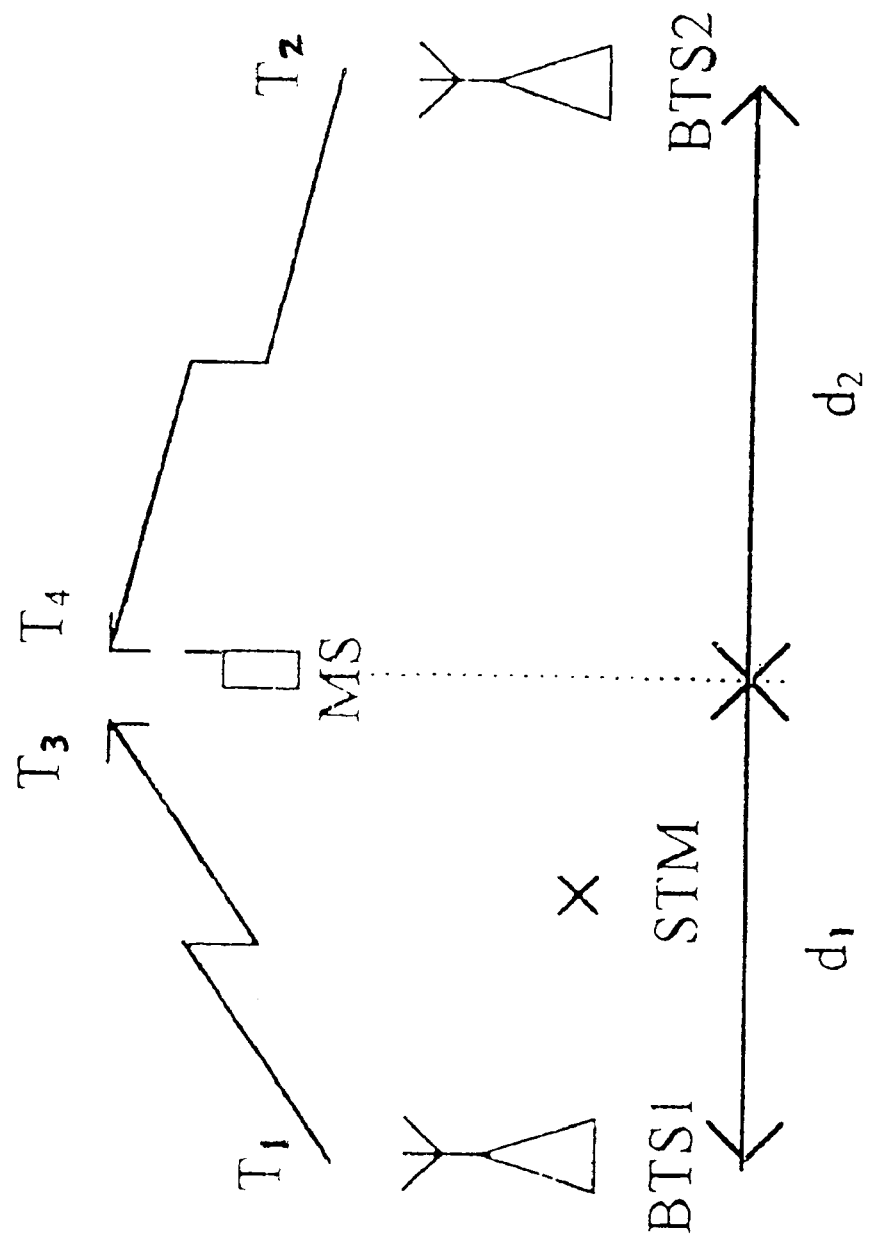
FIG. 1 is a diagram illustrating the principle of determining the timing differences between two base transceiver stations in a mobile radio network according to the present invention.

The different quantities used by the method according to the present invention will be further explained with reference to FIG. 1 which illustrates the principle of determining the timing differences between two base transceiver stations BTS1 and BTS2. As illustrated in FIG. 1, while $T_1$ denotes the time when a first radio signal is transmitted from the base transceiver station BTS1, this first radio signal is received by the mobile station MS at a time $T_3$. Accordingly, a second radio signal is transmitted by the neighboring base transceiver station BTS2 at a time $T_2$ and is received by the mobile station MS at a time $T_4$.

The observed time difference which is also referred to as the time difference on arrival (TDOA) is the time interval as observed by the mobile station between the reception of two signals from two different base transceiver stations. Referring to FIG. 1, the observed time difference OTD which is continuously determined by the mobile station itself is the difference between the two reception times $T_3$ and $T_4$: OTD=$T_3$−$T_4$. The real time difference RTD corresponds to the transmission time difference between the signals transmitted by the two base transceiver stations, i.e. RTD=$T_1$−$T_2$. Since the transmission times $T_1$ and $T_2$ are not known to the mobile station, the real time difference is also not known to the mobile station.

Furthermore, the geometric time difference GTD represents the difference between the propagation times of the two signals transmitted by the two base transceiver stations and received by the mobile station. According to the situation illustrated in FIG. 1, GTD=$T_3$−$T_1$−($T_4$−$T_2$). In other words, the geometric time difference corresponds to the respective difference of the distances $d_1$ and $d_2$ of these two different base transceiver stations from the mobile station, divided by the speed of the radio wave propagation c, i.e. GTD=($d_1$−$d_2$)/c. If the two base transceiver stations are located at the same distance from the mobile station, then GTD is zero, and the observed time difference is only due to synchronisation differences in the network. In addition, when the base transceiver stations are synchronised with each other (i.e. RTD=0), then OTD equals GTD, and the observed time difference is only due to the different positions of the base transceiver stations and the mobile station.

In addition, in order to determine the observed time difference between the signals transmitted by the base transceiver stations and to calculate the real time difference on the basis thereon, a dedicated measurement equipment is used with which some of the base transceiver stations acting as fixed measurement stations are equipped.

According to this embodiment of the present invention, this measurement equipment is the so-called Site Test Mobile (STM) manufactured by Nokia. As a matter of course, the present invention is by no means limited to the use of this type of measurement equipment STM, and any other type of suitable measurement equipment may also be used instead. In addition, the measurement equipment does not need to be mobile, but can be located in a fixed position. For the sake of clarity, only a single measurement equipment STM is shown in FIG. 1 at a place located somewhere between the two base transceiver stations BTS1 and BTS2.

The method according to the present invention can be advantageously applied to locating mobile stations in the area covered by the mobile radio network. Referring to FIG. 1, for calculating a location estimate of the mobile station MS in the mobile radio network, it is necessary to determine the difference between the distances $d_1$ and $d_2$ which can be obtained from the geometric time difference of the mobile station with respect to the two base transceiver stations. As a matter of course, in order to calculate the location of the mobile station, it is necessary to receive at least one further signal from a third base transceiver station which is, for the sake of clarity, not shown in FIG. 1.

Figure 2:
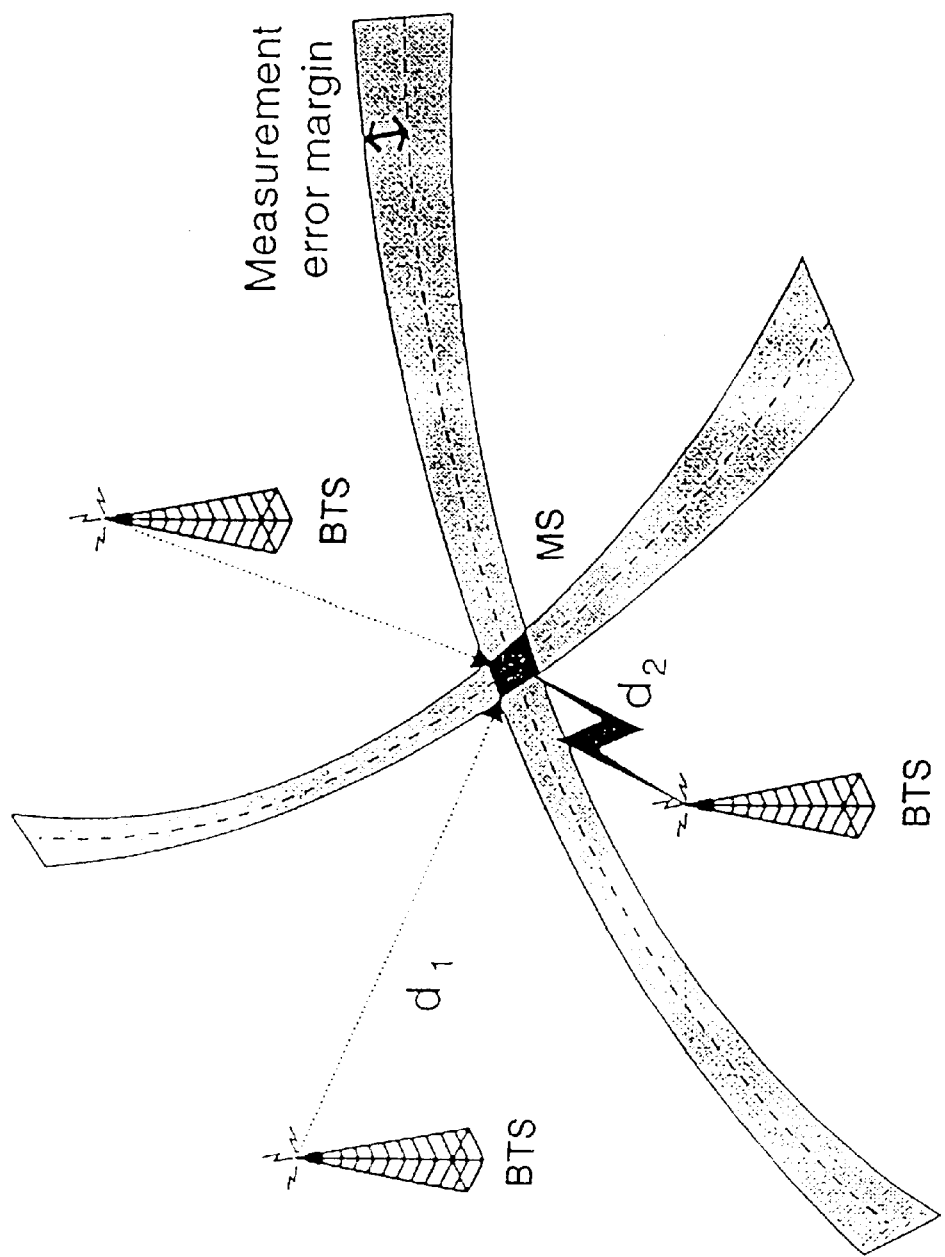
FIG. 2 is a diagram showing an application example of the method according to the present invention for locating mobile stations in a mobile radio network.

More specifically, the principle underlying the application of this method to locating mobile stations will be described hereinbelow with reference to FIG. 2. The calculation of the location of the mobile station according to this method is based on the fact that the possible location of the mobile station MS between two neighbouring base transceiver stations BTS is positioned on a hyperbola since the difference between the distance $d_1$ of the mobile station to the first base transceiver station and the distance $d_2$ thereof to the second base transceiver station is constant. In other words, the mobile station concerned is subject to a constant value of the observed time difference of the signals received from these two base transceiver stations. Since the measurement result has a certain error margin, the potential location area of the mobile station is in reality a band between two hyperbolae, the width of the band depending on the error margin of the measurement result. The possible location area is illustrated by a grey area in FIG. 2, while the dashed line represents the measured observed time differences. In order to actually locate the mobile station, it is necessary to receive signals from at least three base transceiver stations. In this case, the mobile station is located in the intersection of two hyperbolae obtained from two (constant) observed time differences from these three base transceiver stations (it is even possible to form a third hyperbola on the basis of the signals received from three base transceiver stations). The actual location area of the mobile station is illustrated by a black area at the intersection of the grey areas in FIG. 2. If more than three base transceiver stations and thus more observed time differences are available, the possible location area of the mobile station can be further reduced, thus increasing the accuracy of locating the mobile station.

In order to actually locate a particular mobile station on the basis of the geometric time difference, the observed time difference OTD and the real time difference RTD have to be known. Furthermore, in order to determine the real time difference, the positions of the different base transceiver stations and that of the measurement equipment STM have to be known. The positions of the base transceiver stations are predetermined and defined by co-ordinates in an x-y-plane. Since the location of the measurement equipment is also known, the geometric time differences GTD with respect to the measurement equipment can be calculated. Thus, since the observed time difference OTD between the signals received by the measurement equipment is determined by the measurement equipment, it is possible to determine the real time difference RTD according to the method described above. This real time difference is calculated by determining the difference between the geometric time difference GTD corresponding to the distances of the measurement equipment to the base transceiver stations, and the observed time difference OTD.

Furthermore, since the real time difference is independent from the position at which it is determined, the calculated value corresponds to the real time difference as observed by the mobile station. Thus, after determination of the observed time difference OTD by the mobile station, the derived value is transmitted to some central unit. Thereafter, the geometric time difference can be calculated from which the distance differences between the mobile station and the base transceiver stations are determined. In this way, one hyperbola can be drawn from the signals received from two base transceiver stations, since one geometric time difference can be calculated. If signals are received from three base transceiver stations, then three hyperbolae can be drawn from two geometric time differences, thereby allowing the possible location of the mobile station to be determined.

Figure 3:
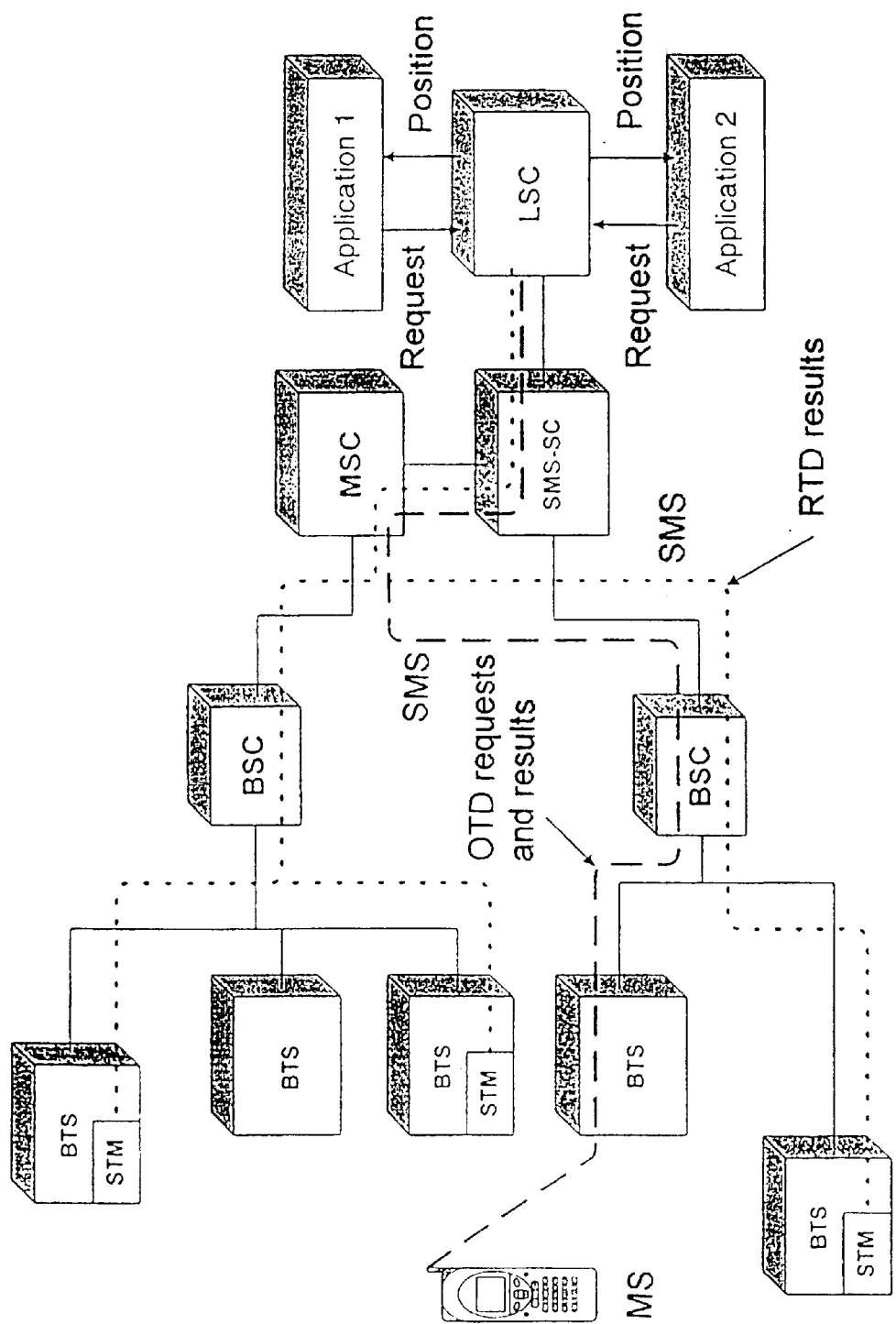
FIG. 3 is a diagram showing a practical arrangement to which the method according to the present invention can be applied for locating mobile stations in a GSM system.

FIG. 3 is a diagram showing a practical arrangement to which the method according to the present invention can be applied for determining the location of a mobile station in a GSM mobile radio network.

As shown by a dotted line in FIG. 3, the RTD results calculated by the measurement equipment STM are transmitted via a base station controller BSC, a mobile switching center MSC, a short message service-service center SMS-SC to a location service center LSC. Alternatively, the measurement equipment may only report the determined OTD results to the location service center which in turn calculates the real time difference. The location service center can be either provided as a separate entity in the mobile radio network as shown in FIG. 3, or it can be provided in a distributed manner over the whole mobile radio network, e.g. in any of the base transceiver stations. In addition, as shown by a dashed line in FIG. 3, the TDOA information (or OTD results) can be relayed from the mobile station MS usually via the serving base transceiver station BTS, the base station controller BSC, the mobile switching center MSC, the short message service-service center SMS-SC to the location service center LSC.

In general, the location service center then calculates the difference between the OTD results transmitted from the mobile station and the RTD results transmitted from the measurement equipment STM so as to calculate a location estimate of the mobile station MS. In other words, the location service center calculates the location of the mobile station on the basis of the geometric time difference which is the difference between the observed time difference and the real time difference. The location service center then outputs the determined position co-ordinates of the mobile station to a number of applications (e.g. applications 1 and 2 shown in FIG. 3) which have issued a location request to the location service center in advance concerning a particular mobile station. Such a location request initiates the transmission of an OTD request from the location service center to the mobile station.

Since it is possible that the timing differences of the base transceiver stations vary from one measurement to the next, the OTD results calculated by the measurement equipment are periodically reported to the location service center.

As illustrated in FIG. 3, it is not necessary that every base transceiver station BTS is provided with its own measurement equipment STM. For instance, in urban areas where many base transceiver stations are located close to each other, it may be sufficient to provide only e.g. every sixth base transceiver station with a measurement equipment.

Furthermore, according to another preferred embodiment of the present invention, the mobile station MS can determine its own position itself. For this purpose, the real time differences RTD calculated by either the measurement equipment or the location service center are transmitted to the mobile station. The mobile station determines the timing information of the signals received from several base transceiver stations, i.e. the observed time differences, and calculates the geometric time difference in the same manner as described above. On the basis of the geometric time difference, the mobile station is able to determine its position on its own.

More specifically, the calculated real time differences RTD or the observed time differences OTD can be transmitted from the measurement equipment STM to the location service center LSC using any of the following four channels:

the short message service (SMS),
undefined supplementary service data (USSD),
a measurement report, a BSSMAP message and a message between a mobile switching center MSC and the location service center LSC, or
a totally new message.

The short message service is a special GSM service for delivering short text messages either from one mobile station to another or from a central base station to all mobile stations in a particular geographical region. In practice, the short message service is implemented as a connectionless protocol, and the messages are transmitted on one of the signalling channels (either the Slow Associated Control Channel (SACCH) or the Stand Alone Dedicated Control Channel (SDCCH)).

Furthermore, the undefined supplementary service data (USSD) are data the content of which is not defined by any specification. These data can be used by an operator to implement new operator specific services.

In addition, base station system management application part (BSSMAP) messages are used in the communication between the mobile switching center MSC and the base station system BSS. They support all procedures between the mobile switching center and the base station system which require information processing related to single calls and resource management.

According to the embodiment shown in FIG. 3, for transmission of OTD requests and results the short message service SMS is used between the base transceiver stations BTS and the mobile station MS. Furthermore, according to this embodiment, the SMS channel is also used for transmission of the RTD results in the uplink direction from the measurement equipment STM to the location service center LSC.

The use of the SACCH channel for transmission of measurement information has the following advantages. Since a SACCH burst is transmitted at intervals of 480 ms in the GSM system, the measurement information is transmitted sufficiently often. Further, the measurement information can even be transmitted during an ongoing call. Moreover, since an already existing channel is used for transmission of additional information, neither the load on the radio link is increased nor the quality of the transmitted voice signals is impaired.

The measurement process in the measurement equipment STM can be triggered and controlled by sending a special measurement command signal as RTD request or command using e.g. the short message service or the undefined supplementary service data to be sent to the measurement equipment. The transmission of the command signal using the short message service is again represented by the dotted line in FIG. 3. This command signal may contain the following information:

the number of measurement sets of one SMS message,
the measurement frequency (e.g. once every 30 seconds),
the measurement duration (e.g. the next ten minutes, five SMS messages or until a stop command is received), and
the identification of those base transceiver stations BTS being measured.

Hence, according to the present invention, since the real time difference between the plurality of base transceiver stations can be accurately determined, it becomes possible to precisely determine the locations of mobile stations being positioned somewhere in the mobile radio network. In detail, experiments have shown that it is possible to reduce the mean error of mobile station location to approximately 300 m. Furthermore, the position information of a mobile station can be obtained quickly and at short intervals because the position information becomes available in real time.

Furthermore, according to the above description, the measurement equipment is located in the base transceiver station. This has the following advantages. Since the antenna for receiving the signals is located at the antenna of the base transceiver station, it has in many cases a line of sight connection to other base transceiver stations. As a result, the attenuation between signals received from neighbouring base transceiver stations is low. Furthermore, since only some software modifications in the mobile station are needed, only little additional effort is required. Thus, the present invention can be realized at almost no extra cost. In addition, the measurement equipment may of course also be used for other purposes. However, it is also not necessary that the measurement equipment is located in the base transceiver station, and the measurement equipment may of course be located in some other suitable place.

In the above description, the application of the method to base transceiver stations in a mobile radio network has been described as an example. However, the method according to the present invention can as a matter of course be applied to determine the timing differences between several radio transmitters in any type of radio network.

Furthermore, although the above description referred to the Pan-European digital cellular radio network GSM as an example, the present invention can be applied with some modifications to any other digital system. For example, the present invention is also applicable to the DCS1800/1900 system or the JDC system used in Japan.

It should be understood that the above description has been made only with reference to the preferred embodiments of the present invention. Therefore, the present invention is not limited to the above described preferred embodiments, but is also intended to cover any variations and modifications to be made by a person skilled in the-art within the spirit and scope of the present invention as defined in the appended claims.

What is claimed is:

1. A method for determining timing differences between a plurality of radio transmitters, comprising the steps of:
   determining timing information of signals received by measuring means from said plurality of radio transmitters; and
   determining the timing differences between said plurality of radio transmitters on the basis of said timing information determined by said measuring means,
   providing said measuring means at a known location;
   performing said determining step of determining timing differences by using respective distance differences between said plurality of radio transmitters and said measuring means; and
   controlling said determination of said timing differences by transmitting a command signal from a location service center.

2. A method according to claim 1, wherein said radio transmitters are base transceiver stations in a mobile radio network.

3. A method according to claim 2, further comprising the steps of:
   determining timing information of signals received by said mobile station from said plurality of base transceiver stations; and
   determining the location of said mobile station on the basis of the timing information determined by said mobile station and said timing differences between said plurality of base transceiver stations.

4. A method according to claim 3, wherein said timing information is transmitted using the short message service, undefined supplementary service data or a BSSMAP message.

5. A method according to claim 3, wherein said timing differences are transmitted using the short message service, undefined supplementary service data or a BSSMAP message.

6. A method according to claim 3, wherein said command signal is transmitted using the short message service or undefined supplementary service data, and wherein said command signal contains some of the following information:
   the number of measurement sets of one message,
   the measurement frequency,
   the measurement duration, and
   the identification of those base transceiver stations being measured.

7. A method according to claim 1, wherein one or several of said plurality of radio transmitters are provided with said measuring means.

8. A method according to claim 1, wherein said measuring means is/are arranged at a distance from any of said plurality of radio transmitters.

9. A radio network comprising:
   a plurality of radio transmitters; and
   measuring means for determining timing information of signals received from said plurality of radio transmitters, wherein said measuring means is arranged to determine the timing differences between said plurality of radio transmitters on the basis of said timing information determined by said measuring means,
   said measuring means is provided at a known location; and
   said measuring means is arranged to perform said determination of said timing difference on the basis of respective distance difference between said plurality of radio transmitters and said measuring means, wherein said determination of said timing difference is controlled on the basis of a command signal received from a location service center.

10. A radio network according to claim 9, wherein one or several of said plurality of radio transmitters are provided with said measuring means.

11. A radio network according to claim 9, wherein said measuring means is/are arranged at a distance from said plurality of radio transmitters.

12. A radio network according to claim 9, wherein said radio network is a mobile radio network and said radio transmitters are base transceiver stations.

13. A radio network according to claim 12, wherein
   a mobile station is adapted to determine timing information of signals transmitted from said plurality of base transceiver stations; and
   the location of said mobile station is determined on the basis of said timing information determined by said mobile station and said timing differences between said plurality of base transceiver stations.

14. A radio network according to claim 13, wherein
   said location service center is adapted to determine the location of said mobile station (MS).

15. A radio network according to claim 14, wherein said location service center is spatially distributed over said mobile radio network.

16. A radio network according to claim 14, wherein
   said measuring means is adapted to transmit said timing information to said location service center or said mobile station is adapted to transmit said timing information to said location service center, wherein said transmission of said timing information is effected using the short message service, undefined supplementary service data or a BSSMAP message.

17. A radio network according to claim 14, wherein said timing differences are transmitted from said measuring means to said location service center using the short message service, undefined supplementary service data or a BSSMAP message.

18. A radio network according to claim 13, wherein said command signal is transmitted by using the short message service or undefined supplementary service data, and wherein said command signal contains some of the following information:
   the number of measurement sets of one message,
   the measurement frequency,
   the measurement duration, and
   the identification of those base transceiver stations being measured.

19. A mobile station adapted to be located in a mobile radio network according to claim 12, wherein
   said mobile station comprises
   determination means adapted to determine the position of said mobile station on the basis of timing information of signals received from a plurality of base transceiver stations and timing differences between said plurality of base transceiver stations, transmitted to said mobile station,
   wherein the timing differences are determined by measuring means of the network on the basis of respective distance differences between said plurality of base transceiver stations and said measuring means, the determining of said timing differences being controlled on the basis of a command signal received from a location service center.

* * * * *